United States Patent [19]
Vaughn et al.

[11] Patent Number: 5,596,254
[45] Date of Patent: Jan. 21, 1997

[54] TWO-AXIS ANGULAR EFFECTOR

[75] Inventors: Mark R. Vaughn, Albuquerque; Rush D. Robinett, III, Tijeras; John R. Phelan; Don M. Van Zuiden, both of Albuquerque, all of N.M.

[73] Assignee: Sandia Corporation, Albuquerque, N.M.

[21] Appl. No.: 289,979

[22] Filed: Aug. 12, 1994

[51] Int. Cl.⁶ ........................... G05G 11/00
[52] U.S. Cl. .............. 318/568.11; 318/568.19; 318/687; 901/28; 74/479.01
[58] Field of Search ............... 318/568.1–575, 318/687; 1/27–29; 74/479 BE, 479 BP, 479 BJ, 479 BW, 479.01, 490.01, 490.03, 490.05

[56] References Cited

U.S. PATENT DOCUMENTS

| | | | |
|---|---|---|---|
| 3,792,782 | 2/1974 | Melton | 901/22 X |
| 4,547,120 | 10/1985 | Turner, Jr. et al. | 901/22 X |
| 4,805,477 | 2/1989 | Akeel | 901/28 X |
| 4,878,393 | 11/1989 | Duta et al. | 901/29 X |
| 4,951,521 | 8/1990 | Jacobson | 901/28 X |
| 5,142,930 | 9/1992 | Allen et al. | 901/28 X |
| 5,224,032 | 6/1993 | Wörn et al. | 364/167.01 |
| 5,243,873 | 9/1993 | Demers | 901/28 X |
| 5,394,766 | 3/1995 | Johnson et al. | 901/22 X |

*Primary Examiner*—William M. Shoop, Jr.
*Assistant Examiner*—Brian Sircus
*Attorney, Agent, or Firm*—Brian W. Dodson

[57] ABSTRACT

A new class of coplanar two-axis angular effectors. These effectors combine a two-axis rotational joint analogous to a Cardan joint with linear actuators in a manner to produce a wider range of rotational motion about both axes defined by the joint. This new class of effectors also allows design of robotic manipulators having very high strength and efficiency. These effectors are particularly suited for remote operation in unknown surroundings, because of their extraordinary versatility. An immediate application is to the problems which arise in nuclear waste remediation.

17 Claims, 5 Drawing Sheets

TWO-AXIS ANGULAR EFFECTOR

This invention was made with Government support under Contract DE-AC0494DP85000 awarded by the U.S. Department of Energy. The Government has certain rights in the invention.

BACKGROUND

The present invention relates generally to the problem of robotic and/or remotely-controlled manipulators and, more particularly, to a simple, compact device which provides general wrist-like motions useful for a wide range of torque levels.

The development of robotic manipulators has undergone rapid development in the past twenty years. However, most robots comprise an arm made of a series of one-axis "hinge" joints (similar in principle to the human elbow joint) and rotational joints having a single axis of rotation. At the end of this arm is mounted the tool or manipulating device. Such arrangements are useful for a wide variety of applications. Indeed, there exist automobile assembly plants which are almost entirely dependent on such manipulators.

Despite a considerable degree of success, however, there are definite limitations to the capabilities and efficiency of such robotic manipulators. A major problem for general application is the need to use a rotational joint at the bottom of the arm to allow a large volume of space to be accessible using a minimum of joints and links (a link is the member between joints). However, use of a rotational joint means that any control or power conduits (generally either electric or hydraulic lines) traversing the rotational joint to reach joints further along the arm will be twisted on rotational motion. Such twisting leads to complications such as conduit wear, rotation limits, slip rings, hydraulic swivel joints, and other complications. The result is that the capability and reliability of the robotic arm are compromised.

A further problem concerns the difficulty of obtaining fluid and efficient motion with an arm made up of one-axis hinge and rotational joints. It is true that any motion can be dissected into simple bending and rotational movements. However, the practical issue is to produce the desired types of movement with a minimum of complexity (complexity being inversely proportional to reliability). A useful illustration to contemplate is the striking of a tennis ball with a racket. The human body has four main joints involved in producing the appropriate racket motion, the wrist, forearm, elbow, and shoulder. (The structure of the wrist-forearm-elbow structure allows perhaps 120° rotation of the wrist relative to the elbow. For the present discussion, this is considered another joint.) In a tennis swing, the shoulder joint lifts the arm from the side of the body and swings the arm back and forth at an attitude giving maximum leverage and power—a two-axis motion which is provided by a structure similar to a ball and socket joint. The elbow joint provides one-axis rotational motion which mainly positions the tennis racket at a point where it can impact the ball. The wrist, however, controls the orientation and detailed motion of the racket (e.g., to put spin on the ball) by a combination of rotation along the forearm axis (made possible by the overall wrist-forearm-elbow structure as described above) and rotation about the other two rotational axes. The resulting structure is capable of near-miracles of ball control, making the game of tennis thrilling to watch.

Consider, however, a hypothetical situation where all arm joints are one-axis hinge joints, except for one rotational joint of restricted rotation between the elbow and wrist. The shoulder joint is again used to raise the arm from the side of the body. However, that is the only motion of which it is capable, so it can play no further role in the swing. In particular, it provides a weak anchor for the subsequent swing rather than a dynamic connection to the mass and power of the body provided by a real shoulder. The elbow joint is still a hinge joint, and the best opportunity we have to obtain leverage for the swing. We will therefore assume that the elbow is oriented just as it is when one lifts an arm to the side from the shoulder. The elbow is then capable of giving a back-and-forth motion in a plane which is, depending on the shoulder position, approximately parallel to the ground. The hand now grips the racket in the conventional fashion, connected to a wrist that allows pivoting around only one axis (again assume the major axis of a real wrist, so that the axis of rotation of the wrist is in the plane of the palm and perpendicular to the forearm) and a forearm which allows about 120° of rotation about its own axis. A few moments of contortions with these limitations in mind will quickly convince the reader that the structure described above is nearly useless when required to produce the complex dynamic motions required to play tennis properly, even though it is perfectly suitable to a small set of well-defined manipulations, such as performing simple assembly steps in a manufacturing environment under close human observation and control.

It is possible to design an arm out of one-axis hinge joints and restricted in-line rotational joints that allows motions suitable for playing tennis, but such an arm is extremely complex, presenting many difficulties in developing a suitable control system. The combination of a desired motion from one position may require use of a non-obvious path, resulting in inhibited and rather strange motions. (Mathematically this is similar to the property of frustration in spin glasses, wherein spins in a material interact in such a manner as to get 'stuck' in an orientational pattern which is not the thermodynamic ground state of the system.)

An example of the difficulties which can arise in even a simple manipulator based on one-axis joints is provided by an altazimuth telescope mount. Such a mount has a first axis of rotation perpendicular to the ground on which the mount sits and a second axis of rotation perpendicular to the first which allows for rotation limited between 0° (the horizon) and 90° (straight overhead). (Such limitations are often required because of the size and design of the telescope itself.) It is clear that such a mount will allow a telescope mounted on a shaft turning with the second axis of rotation complete access to any point in the sky. It is also common to put motor drives on both axes to allow the telescope to follow the motion of the stars in the sky, to prolong the observation period. As neither axis of the altazimuth telescope mount is parallel to the Earth's axis of rotation, however, the rate at which the first and second axes are driven is a strong function of where the telescope is pointing. This rate is found using a coordinate transformation matrix, and the required control is usually provided by a computer system. The problem is that the transformation function has a singularity. Consider the case where the telescope is following a star which will pass directly overhead at midnight. At 11:59:59 PM the coordinates of the telescope mount are (36°, 89.99°) (first axis, second axis positions). At 12:00:01 AM the coordinates required to follow the sidereal motion of the star are (324°, 89.99°). In other words, even though the mount allows access to every part of the sky, extraordinary rapid motion is required to follow an object which passes nearly overhead. This is a very simple example of a problem which becomes an omnipresent concern when complex manipulators made of simple joints are considered.

The point of the above discussion is that the problem of design of robotic manipulators suitable for a wide range of functions, especially when the functions may involve uncontrolled classes of real-world environments and situations not thought of during design, requires a new view toward design of powered joints. The desire for reliable and smoothly functioning manipulators, combined with the limitations of present approaches show a clear need for simple multi-axis joints capable of being combined into manipulators suitable for a wide range of applications. A second need is for powered joints of minimal dimensions, so that the manipulator can be used in existing environments having a limited access, such as sampling and removing waste material from a radioactive waste storage tank. The picture of a computer-controlled snake comes to mind as the desired structure. That is, a long thin manipulator made of a nearly continuous backbone of two-axis angular joints and a 'musculature' anchored on the backbone itself to provide the leverage required to exert the required forces for movement and operation.

SUMMARY

The present invention relates generally to a new class of two-axis angular joints powered by sets of linear actuators. These effectors address many of the problems outlined above. The basic design principle is to connect two links of a manipulator arm with a joint analogous in function to a Cardan joint, and then to anchor a first set of linear actuators (which may use any appropriate power source) to one link and a second set of linear actuators to the other link, both sets of linear actuators being connected to the Cardan joint in a manner such that linear motion of the first set of linear actuators is converted into rotation about a first axis, and linear motion of the second set of linear actuators is converted into rotation about a second axis. This placement of the actuators avoids interference between the operation of the two independent axes of rotation, a feat virtually impossible to accomplish when both actuators are mounted on the same link. Numerous embodiments and other features, aspects, and advantages of the present invention will become better understood with reference to the following description and appended claims.

BRIEF DESCRIPTION OF THE DRAWINGS

The accompanying drawings, which are incorporated in and form part of the specification, illustrate the present invention and, together with the description, serve to explain the invention.

FIG. 1 shows a schematic representation of a clevis joint, a simple one-axis rotational joint

FIG. 3 shows a classic two-axis coplanar Cardan joint.

FIG. 4 illustrates a variety of implementations of a Cardan-type joint.

DESCRIPTION

Figure 1A:
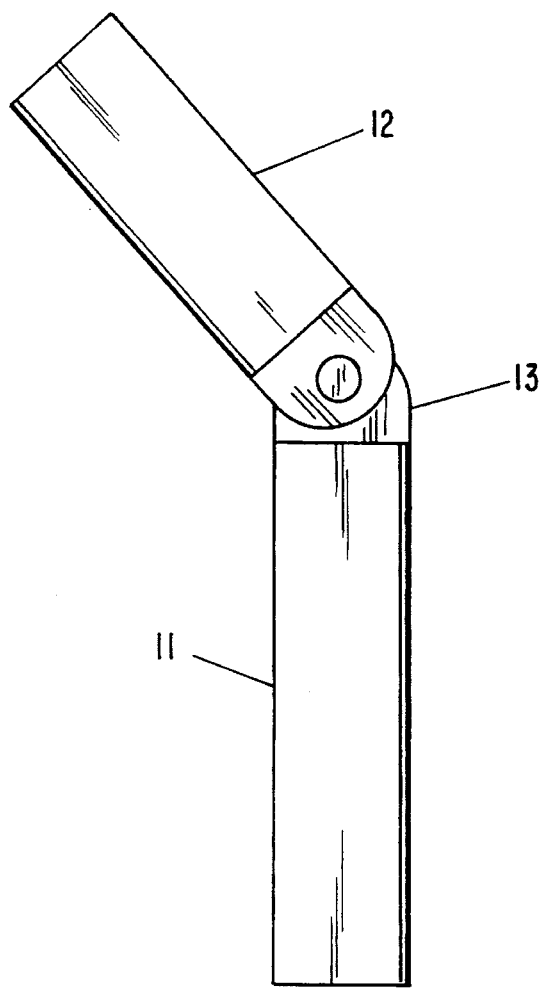
FIG. 1a shows a side view of such a joint.
Figure 1B:
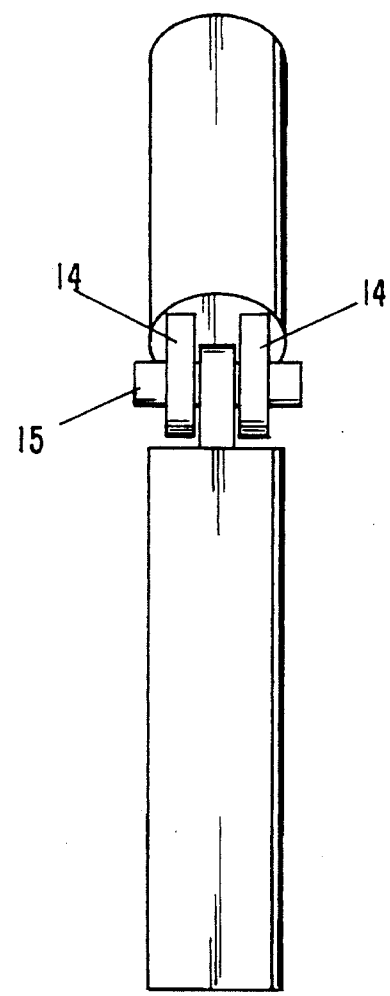
FIG. 1b shows a front view of the same joint.

A common type of angular joint currently used in manipulator arms, the clevis joint, is illustrated schematically in FIG. 1 for purposes of background information. FIG. 1a shows a side view of the joint, and FIG. 1b shows a front view. This joint is essentially a simple hinge attached to two links 11 and 12. The clevis rod end 13 fits between the clevis yoke elements 14, being aligned so that clearance exists for insertion of the clevis pin 15. Such a joint is capable of uniaxial angular motion over a wide range of relative angular orientations of links 11 and 12, the angular range usually being limited by direct interference of the operating parts.

Figure 2:
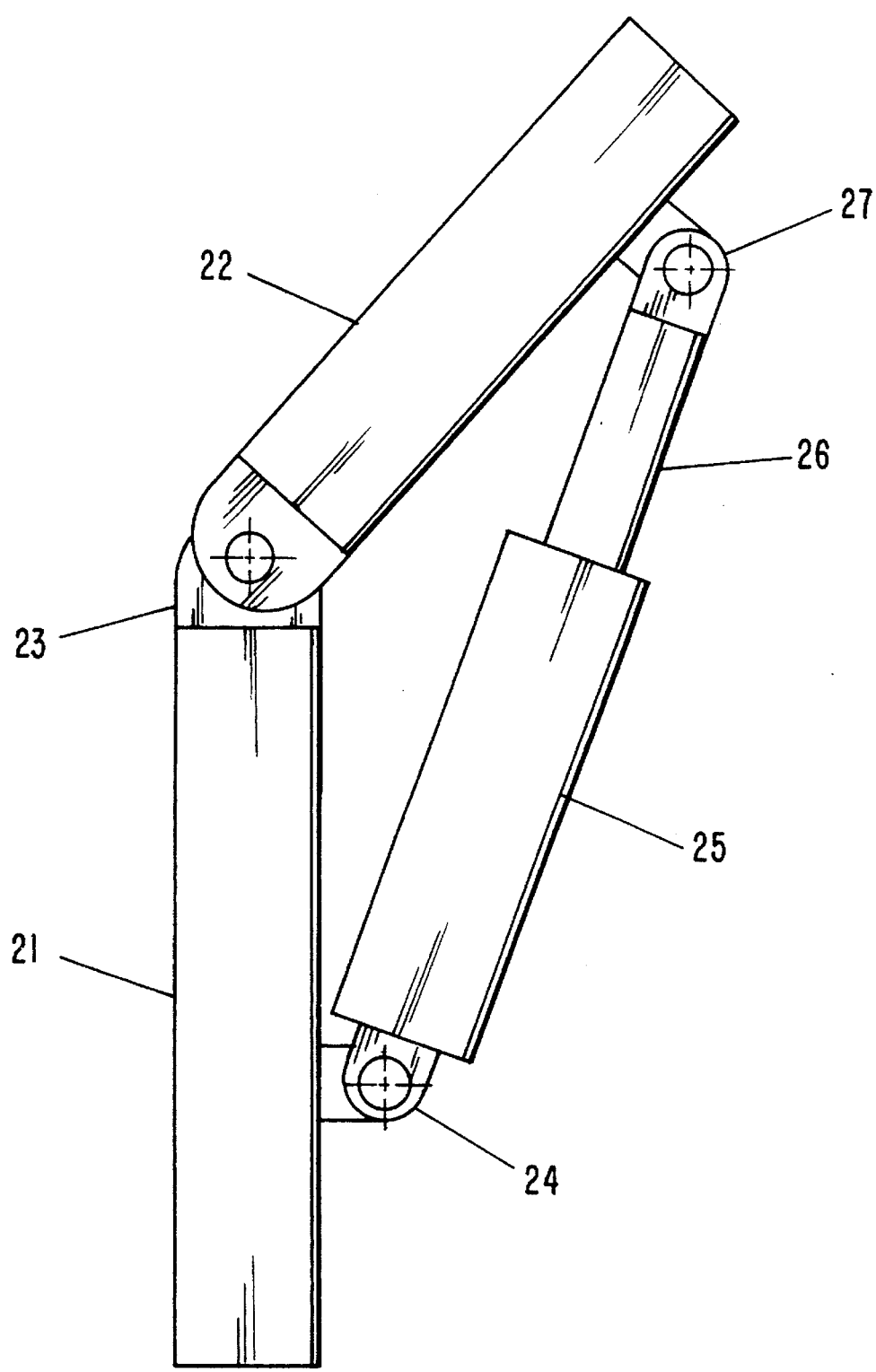
FIG. 2 shows a one-axis angular effector comprising a linear actuator and the simple clevis joint of FIG. 1.

FIG. 2 shows a one-axis angular effector comprising a linear actuator and the simple clevis joint of FIG. 1. The linear actuator assembly 25 and 26 controls the relative orientation of links 21 and 22, which rotate around the one-axis angular joint 23. When activated, the linear actuator rod 26 moves in and out of the linear actuator body 25. As the linear actuator assembly is attached to link 21 by joint 24, and to link 22 by joint 27, a change in length of the linear actuator assembly produces a change in the angle between the two links. As such motion also changes the angle between the axis of the linear actuator assembly and the axes of the two links, joints 24 and 27 must allow a pivoting motion in the common plane. Such an effector is analogous to an elbow joint, as it can only bend in one direction (to the right in FIG. 2). Such an effector, however, is one of the primary building blocks in current robotic technology.

Figures 3A, 3B:
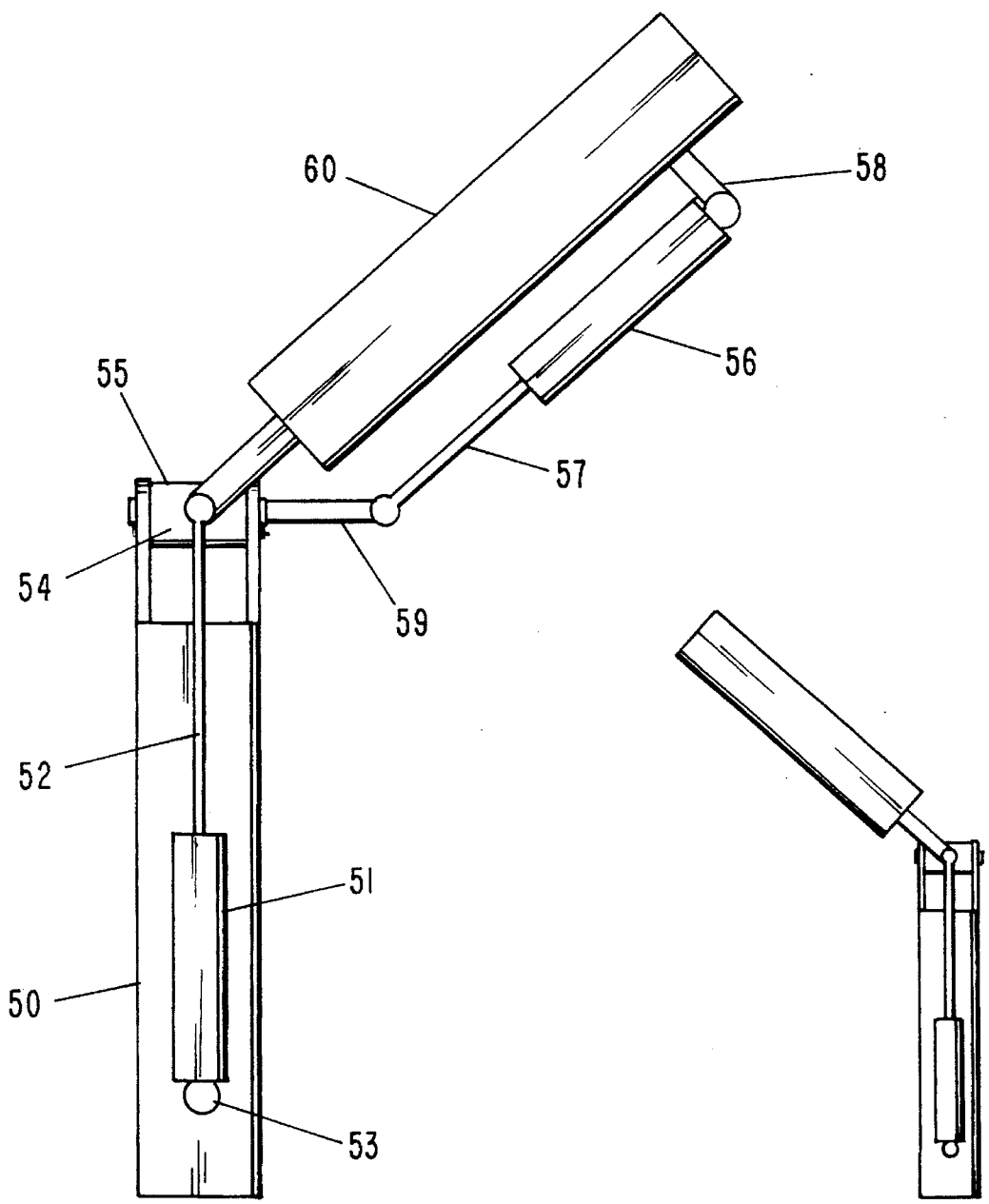
FIG. 3a shows a side view of the joint.
FIG. 3b shows a top view of the joint cutaway at the yoke.

In FIG. 3 appears a coplanar example of the class of two-axis angular joints used in the present invention. FIG. 3a shows an external side view of the joint, whereas FIG. 3b shows a top view of the joint cut away through yoke 35. The object is to allow the relative angular orientation of first and second links 31 and 32 to vary arbitrarily within a wide range. This is accomplished by combining, as shown in FIG. 3a, a pair of one-axis clevis-type joints so that their rotational axes are nominally coplanar and relatively misoriented by a fixed angle (usually 90°). (A small amount of non-coplanarity of the rotational axes can be tolerated in most applications.) The first link 31 has a pair of arms 33 extending from its end, which serve the same purpose as the clevis yoke elements of FIG. 1. (Similarly, the second link 32 has arms 34 which serve the same purpose.) FIG. 3b shows that the role of the clevis rod end is taken over by the two-axis yoke 35, which provides support to the first rotational shafts 36 and the second rotational shafts 37. The first arms 33 have first link rotational bearings 38 to allow rotational motion about the first rotational axis. The same function is served by the second link rotational bearings 39 which are mounted in the second arms 214. The first and second rotational shafts 36 and 37 pass through the first and second link rotational bearings 218 and 39, respectively, into yoke 35, and are mounted there in a manner such that no relative movement of the yoke 35 and the first and second axis shafts 36 and 37 takes place. (Other possibilities will be discussed later.)

The structure in FIG. 3 is an implementation of a Cardan-type joint between links 31 and 32, which allows said links to change their relative angular orientation by independent rotation about two spatial axes. An important property of such a joint is that there are no singularities in the mapping between the angular coordinates of the joint and the relative two-axis orientation of the links, a property not shared by all two-axis joints, as discussed earlier. Note that the first and second link rotational bearings 218 and 219 can be any of a variety of common bearings, including but not limited to sleeve, ball, roller, and needle bearings. These bearings need not be embedded into the link arms, but may be separate structures attached to the link arms in any of a number of ways which will be apparent to one who works in the field. Similarly, the link arms may be assembled to the links rather than using an integral design, and so forth. In addition, designs are possible using one or more link arms per link. (A joint having one link arm per link produces an asymmetric design having only one first and one second axis shaft.) These figures are intended solely to illustrate operating principles and the use of Cardan-type joints in the present invention is intended to include such obvious variations.

FIG. 4 illustrates four implementations of a Cardan-type joint in FIGS. 4a, 4b, 4c, and 4d. In 4a is shown a structure analogous to that of FIG. 3, in that the first and second link rotational bearings 43 are mounted in the first and second link arms 42 and 45 respectively. (The first and second link rotational bearings are given the same reference number for convenience, which should not be interpreted that they must have the same design and/or dimensions.) The first and second rotational shafts 41 and 44 are mounted as in FIG. 3. The major difference is that yoke 40 is not hollow. All structures discussed in FIG. 4 are compatible with either a solid or hollow yoke.

Figure 4A:
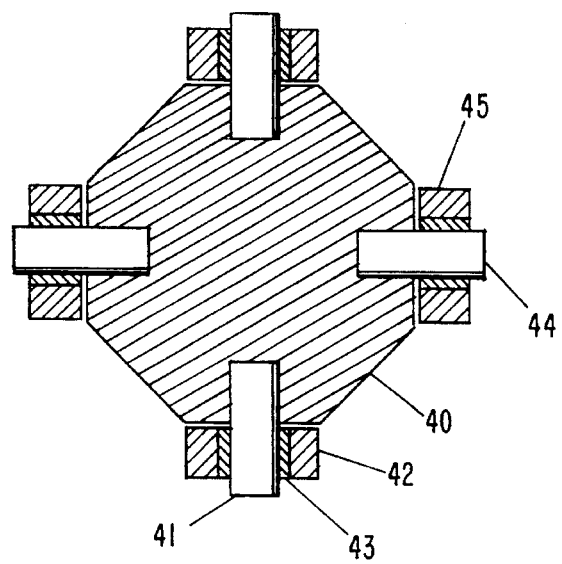
FIG. 4a is a solid yoke design with rotational shafts fixed in file yoke and bearings in the first and second set of arms.
Figure 4B:
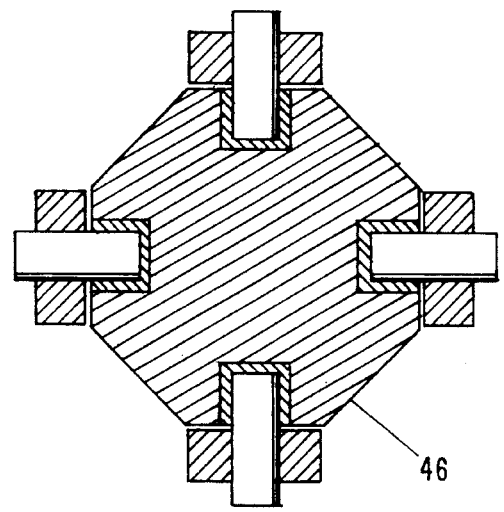
FIG. 4b is similar to 4a, save that the bearings are now in the yoke, and the rotational shafts are fixed in the sets of arms.

FIG. 4b is nearly the same as the structure in 4a, except that the axis rotational bearings 46 are mounted on the yoke instead of in the link arms. In this instance, the first and second rotational shafts are mounted solidly on the first and second link arms respectively. Again a hollow yoke may be used, and a wide variety of obvious variations of this schematic design are included in the scope of the present invention.

Figure 4C:
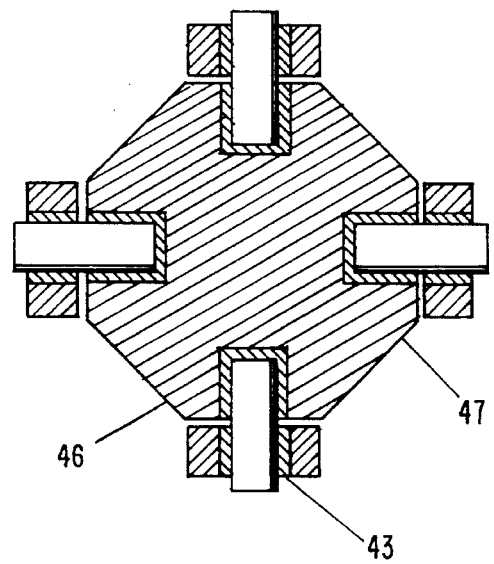
In FIG. 4c there are bearings in both the yoke and the arms, allowing independent motion of yoke, arms, and shafts. Finally.

FIG. 4c shows an implementation in which first and second rotational bearings are mounted in pairs 43 and 47, bearings 43 being mounted in the link arms and bearings 47 being mounted in the yoke. The result is that not only can the links rotate with respect to the yoke, but that the axis shafts are also free to rotate independent of the other components. Such designs form a sub-class of Cardan-type joints important for application in the present invention. Again a hollow yoke may be used, and design variations obvious to one working in the field are included.

Figure 4D:
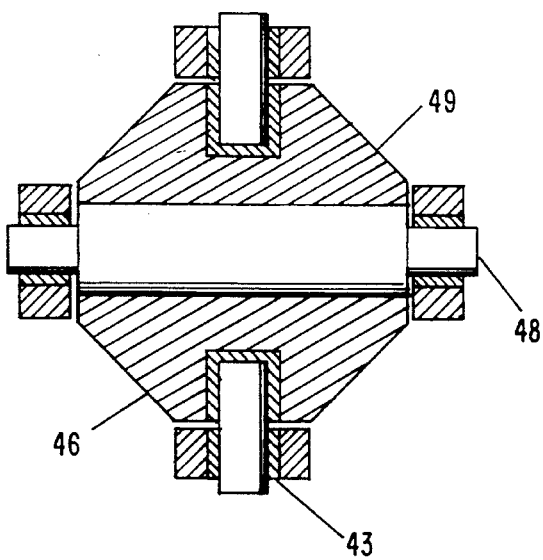
FIG. 4d shows a design having a single rotational shaft along one axis, the axis completely penetrating the yoke and one set of arms.

FIG. 4d shows that one set of rotational shafts may be replaced by a single continuous rotational shaft 48 penetrating the yoke. The illustration shows the shaft 48 passing through a rotational bearing 49, but it is also possible to use a design in which shaft 48 is fixed in the yoke. Clearly it is also possible to use a design in which the shaft is fixed in the link arms and passes through a rotational bearing 49. One may also use related designs having a hollow yoke, with either a single bearing 49 or a pair of bearings analogous to bearings 47 in 4c). Concerns for weight reduction will often impel the use of a hollow yoke.

FIGS. 3 and 4 were included to illustrate the range of possible structures of a Cardan-type joint, as such elements are vital to the operation of the present invention. The Cardan-type joints, however, are not claimed as patentable material, but only as a broad class of standard components which form a part of the overall structure of the invention. The term 'Cardan-type joint' will be understood as representing any of the implementations shown in FIGS. 3 and 4, and variations described in the above text describing these figures, including non-coplanar variants.

Figures 5A, 5B:
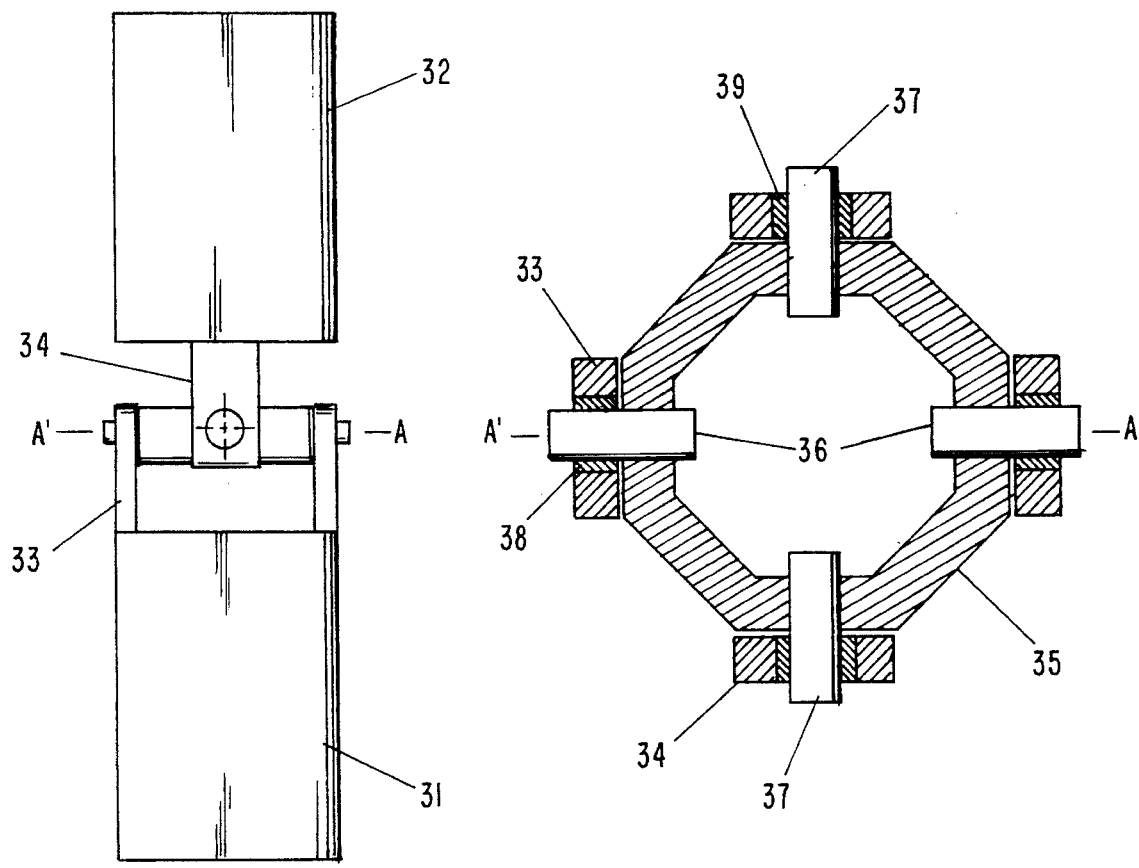
FIG. 5 illustrates the principle of the two-axis angular effector.

FIG. 5 illustrates the principle of the present invention. The device shown is a hydraulically powered two-axis angular effector with coplanar first and second rotational axes. No power source or control system is illustrated. The purpose of the device is to control the relative orientation of first link 50 and second link 60. The first link linear actuator assembly comprises hydraulic cylinder 51, cylinder rod 52, second joint 53, and first joint 54. Similarly, the second link linear actuator assembly comprises hydraulic cylinder 56, cylinder rod 57, fourth joint 58, and third joint 59. A Cardan-type joint 55 connects the links, and provides anchorage for the linear actuator assemblies. In the main figure the second link is displaced to the right, whereas the smaller figure shows the same device with the second link displaced to the left. Note that more of cylinder rod 57 has been pushed out of hydraulic cylinder 56 in the latter case, thus forcing the second link to move. Such an effector allows the relative orientation of the links 50 and 60 to vary within a large conical region of space (but less than a hemisphere) through rotation about two independent axes, and provides good leverage, resulting in large operating torques. The key feature making possible this remarkable performance envelope is the placement of the first axis linear actuator assembly along the first link, and the placement of the second axis linear actuator assembly along the second link. When the actuator assemblies are conventionally mounted, e.g., on the same side of the Cardan-type joint, the unavoidable close corners restrict the size of actuators which can be used and the range of angular motion. The effector in FIG. 5, however, shows only one possible implementation of this class of devices, and is not intended to limit the scope of the present invention, which is defined by the claims.

The two-axis angular effector can be powered by a variety of power sources, the most likely being hydraulic pressure or electricity. Note that swivels, slip rings, and similar contrivances are not required, because the links do not rotate, but simply swing back and fourth. The control system, however, is more complicated, particularly when hydraulic pressure is utilized for operation. In any event, a common problem in control of such systems is the interaction between mechanical resonances of the device and time constants associated with the power source, the control system, or both. Because of the relative motion of the links, flexible hose is used between the controlling servovalves and the cylinders, resulting in a periodic variation in the supply pressure and rate of fluid flow, which produces a twitching motion characteristic of hydraulic manipulators.

Many varieties of control system suitable for operation of such an effector will be obvious to one skilled in the art. However, the high degree of stability and positional accuracy required for the intended application of this invention in robotic manipulators impelled development of a high-precision control system. A rotational angle sensor is used on each axis to measure the current relative orientation of the two links. The first set of parameters of interest $\alpha_\phi$ and $\alpha_\phi$ are equal to the difference between the desired orientation and the present orientation. The second set of parameters are the forces $F_\phi$ and $F_\phi$ exerted by the cylinders and thus acting to accelerate the links and any load they are carrying. In the case of a hydraulic system, this force is simply the difference in pressure on the two sides of the cylinder multiplied by the area of the cylinder piston less the area of the cylinder rod on one side. The pressures are measured by standard pressure sensors. The servovalves which drive the hydraulic cylinders are then driven by servo amplifiers whose output current is proportional to $\alpha_\theta F_\phi$ on one axis and $\alpha\phi\, F\phi$ on the other. The result is a force feedback loop which, given an appropriate proportionality parameter (which must be determined for each system), provides extremely rapid and smooth control over the performance of the two-axis angular effector.

The present invention has a very broad scope, with many variations being possible to one skilled in the art. The present invention is intended to be limited only by the claims appended hereto.

We claim:

1. A two-axis angular effector, comprising:
   i) a first link, comprising a first link near mounting locus and a first link far mounting locus;
   ii) a second link, comprising a second link near mounting locus and a second link far mounting locus;
   iii) a two-axis Cardan-type joint, comprising a yoke, a first set of arms connecting to the first link near mounting locus, a second set of arms connecting to the second link near mounting locus, and a first and second set of rotational shafts, said first and second rotational shafts respectively defining a first and a second rotational axis, said rotational axes defining in turn a first and second set of leverage points located such that a force applied parallel to the first (second) link produces a rotational torque about the first and second rotational axes, respectively;
   iv) a set of at least one first link linear actuator assembly, each comprising a linear activator, a first joint connected to a member of the first set of leverage points of the two-axis Cardan-type joint and a second joint connected to the first link far mounting locus, said joints contrived so that the action of each said linear activator varies the distance between the corresponding first and second joints, and so that said joints allow free relative rotation of the first and second links about the first rotational axis;
   v) a set of at least one second link linear actuator assembly, each comprising a linear activator, a third joint connected to a member of the second set of leverage points of the two-axis Cardan-type joint and a fourth joint connected to the second link far mounting locus, said joints contrived so that the action of each said linear activator varies the distance between the corresponding third and fourth joints, and so that said joints allow free relative rotation of the first and second links about the second rotational axis;
   vi) a power source, and;
   vii) a control system to control the relative orientation of the first and second links.

2. The device of claim 1, at least one of said set of second rotational shafts further comprising an exposed end.

3. The device of claim 2, such that at least one member of the first set of leverage points is located coaxially on an exposed end of a member of the set of second rotational shafts.

4. The device of claim 1, at least one of said set of first rotational shafts further comprising an exposed end.

5. The device of claim 4, such that at least one member of the second set of leverage points is located coaxially on an exposed end of a member of the set of first rotational shafts.

6. The device of claim 1, wherein at least one member of the set of first leverage points is located on the yoke of the two-axis Cardan-type joint.

7. The device of claim 1, wherein at least one member of the set of second leverage points is located on the yoke of the two-axis Cardan-type joint.

8. The device of claim 1, said first and second joints allowing rotational motion only about an axis parallel to the first rotational axis.

9. The device of claim 1, said first and second joints allowing rotational motion about axes parallel to the first and second rotational axes.

10. The device of claim 1, said third and fourth joints allowing rotational motion only about an axis parallel to the second rotational axis.

11. The device of claim 1, said third and fourth joints allowing rotational motion about axes parallel to the first and second rotational axes.

12. The device of claim 1, wherein the power source is hydraulic.

13. The device of claim 1, wherein the power source is electrical.

14. The device of claim 1, said control system comprising rotational encoders.

15. The device of claim 1, said control system comprising jet pipe servovalves.

16. The device of claim 1, said control system comprising, for each axis of motion, a force feedback loop comprising a servovalve driven by a servo amplifier with an output current proportional to the product of the difference of the desired angle between the first and second links and the actual angle between the first and second links and the effective force being exerted by the appropriate linear actuators.

17. The device of claim 16, said control system further comprising a computing system to implement said force feedback loop.

* * * * *